Patented Sept. 10, 1946

2,407,333

UNITED STATES PATENT OFFICE 2,407,333

FUMIGATION METHOD

Peter R. Wenck and Walter A. Henson, Midland, Mich., assignors to The Dow Chemical Company, Midland, Mich., a corporation of Michigan No Drawing. Application October 29, 1943, Serial No. 508,260

3 Claims. (Cl. 167—39)

The present invention is concerned with the control of microorganisms and is particularly directed to a fumigation method for killing bacteria and molds on inanimate objects.

It is common practice to fumigate flour, grains, and the like to accomplish the control of beetles, moths, borers, roaches, and rodents. Similarly, the fumigation of warehouses and dwellings is a well established process. While such operations have been largely successful against insect pests, few if any accomplish a simultaneous destruction of microorganisms such as bacteria and molds. Thus, an apparent control of parasites may be obtained, while actually the fumigated material or surface may remain infested with molds and bacteria.

The desirability of controlling microorganisms by fumigation has long been recognized. To date, however, the problem has not been solved in such fashion as to supply a practical procedure whereby a favorable result is accomplished without undesirable effects upon the materials treated. Also, the cost of toxicants and equipment involved in such operation has constituted a factor discouraging to the investigation and development of new control methods.

According to the present invention, it has been discovered that microorganisms such as bacteria and molds are quickly killed when contacted with gaseous 2-bromo-2-methyl-propane or 2-iodo-2-methyl-propane. The desired result is accomplished simply by vaporizing 2-bromo-2-methyl-propane or 2-iodo-2-methyl-propane into the fumigation zone. The compounds as herein described are readily prepared by reacting iso-butylene with hydrogen-bromide or hydrogen-iodide, and in gaseous form tend to hydrolyze on contact with water vapor to liberate hydrogen-bromide or hydrogen-iodide. The 2-bromo-2-methyl-propane boils at 72° C., and the 2-iodo-2-methyl-propane at 99° C.

When operating in accordance with the present invention, the desired amount of toxicant is introduced into the fumigation zone either in gaseous form or as the liquid bromide or iodide which is thereafter warmed or otherwise caused to vaporize in any suitable fashion. The exact amount of material employed varies with the particular organism to be controlled, the temperature and humidity of operation, and upon whether the bromide or iodide is selected as the toxicant. It has been found that as little as 0.1 pound of the organic halide per 1000 cubic feet is effective against a number of representative bacteria at 30° C. and under average conditions of humidity and pressure. Somewhat larger quantities in the neighborhood of 2 to 3 pounds per 1000 cubic feet are required for the control of representative mold organisms. Somewhat smaller amounts of the iodide or bromide give satisfactory controls under conditions of high humidity and temperature. The tendency for the toxicants to hydrolyze to liberate gaseous hydrogen-halide is considered advantageous and contributes materially to the effectiveness of the treating method as herein disclosed and claimed.

Practical applications of the present invention are many. Of particular importance is the utilization of the described method for the control of microorganisms by treatment of fruits, vegetables, and other food products; the fumigation of boxcars, refrigerator cars, warehouses, food containers, and the like; and the fumigation of mattresses, beds, and other hospital or sick room furniture. Other fields of application include the treatment of vats, tubs and reactors in the wood pulp, paper, and fermentation industries; and the fumigation of greenhouses ships' holds, etc.

The following examples illustrate the invention but are not to be construed as limiting.

Example 1

A vapor-tight chamber capable of at least partial evacuation and equipped with an interior circulating fan was employed for the fumigation of paper articles inoculated with the vegetative cells and spores of representative bacteria. The organism bearing articles were placed in the chamber and the latter partially evacuated. The 2-bromo-2-methyl-propane was then vaporized into the chamber in amount sufficient to give a concentration of 0.1 pound per 1000 cubic feet. Air was admitted to the chamber to bring the pressure to atmospheric, the chamber sealed, and the chamber contents blown and circulated to accomplish a uniform distribution of the fumigant. 16 hours later the chamber was opened, blown clear of toxicant, and the paper articles removed and their surfaces examined to determine the presence or absence of living organisms. Control determinations were simultaneously run in chambers into which no fumigant was introduced. The number of bacteria found living on the fumigated surfaces was compared with the number found living on an equivalent surface area of articles from the control chamber to determine the percentage control. It was found that 100 per cent control was obtained against the organisms Salmonella pullorum and *Escherichia communior* with the toxicant at 0.1 pound per 1000 cubic feet. A concentration of 0.5 pound of toxicant per 1000 cubic feet of chamber volume gave a 100 per cent control of *Bacillus mesentericus*. Both determinations were carried out at a temperature of 30° C.

*Example 2*

Similar operations were carried out in which paper articles impregnated with representative mold organisms were exposed to the fumigant. Here a concentration of 1 pound of toxicant per 1000 cubic feet gave 100 per cent control against *Fusarium saubinettii, Macrosporium solani, Rhizoctonium solani,* and *Lenzites trabea*. Three pounds of toxicant per 1000 cubic feet was required to give a 100 per cent control of *Chaetomium globosum*. The determinations against the molds were carried out at 30° C. and for an exposure period of 16 hours.

*Example 3*

A further investigation was made substantially as described in Example 1 in which 0.3 pound of 2-iodo-2-methyl-propane per 1000 cubic feet was vaporized into the fumigation chamber. The paper articles originally inoculated with bacteria were examined after the 16-hour exposure period, and it was found that 100 per cent control had been obtained against the organisms *Salmonella pullorum* and *Escherichia communior*.

While the foregoing examples have disclosed the process of the present invention as applied against certain specific organisms, it is to be understood that these organisms are representative only. By operating in a similar fashion not only the common fungi and bacteria but also pathological bacteria and the like may be controlled.

We claim:

1. The method which comprises fumigating a space wherein the principal known living things subject to destruction by fumigation are microorganisms, with a lethal concentration in air of a toxicant selected from the group consisting of 2-bromo-2-methyl propane and 2-iodo-2-methyl propane.

2. The method which comprises fumigating a space wherein the principal known living things subject to destruction by fumigation are microorganisms, with a lethal concentration in air of 2-bromo-2-methyl propane.

3. The method which comprises fumigating a space wherein the principal known living things subject to destruction by fumigation are microorganisms, with a lethal concentration in air of 2-iodo-2-methyl propane.

PETER R. WENCK.
WALTER A. HENSON.